(12) United States Patent
Evans, V et al.

(10) Patent No.: US 9,869,584 B1
(45) Date of Patent: *Jan. 16, 2018

(54) AMBIENT LIGHT SENSOR

(71) Applicant: Essential Products, Inc., Palo Alto, CA (US)

(72) Inventors: David John Evans, V, Palo Alto, CA (US); Xinrui Jiang, San Jose, CA (US); Andrew E. Rubin, Los Altos, CA (US); Matthew Hershenson, Los Altos, CA (US); Xiaoyu Miao, Palo Alto, CA (US); Joseph Anthony Tate, San Jose, CA (US); Jason Sean Gagne-Keats, Cupertino, CA (US); Rebecca Schultz Zavin, Portola Valley, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/414,894

(22) Filed: Jan. 25, 2017

Related U.S. Application Data

(63) Continuation of application No. 15/233,811, filed on Aug. 10, 2016, now Pat. No. 9,606,000.

(51) Int. Cl.
*G01J 3/28* (2006.01)
*G01J 1/44* (2006.01)
*G01J 1/04* (2006.01)

(52) U.S. Cl.
CPC ............... *G01J 1/44* (2013.01); *G01J 1/0411* (2013.01); *G01J 1/0418* (2013.01); *G01J 2001/444* (2013.01); *G01J 2001/446* (2013.01)

(58) Field of Classification Search
CPC ........ G01J 1/04; G01J 1/44; G01J 3/02; G01J 3/10; G01J 3/28
See application file for complete search history.

(56) References Cited

U.S. PATENT DOCUMENTS

2012/0295665 A1* 11/2012 Pantfoerder .......... G01J 1/0214
455/566
2013/0079656 A1* 3/2013 Dripps ................. A61B 5/7246
600/529

* cited by examiner

*Primary Examiner* — Abdullahi Nur
(74) *Attorney, Agent, or Firm* — Perkins Coie LLP

(57) ABSTRACT

Presented here are devices and methods to correct ambient light measurements made in the presence of optical elements, such as the curved edge of the cover glass associated with the mobile device. In one embodiment, a film with optical properties is placed within the ambient light sensor to diffuse the high-intensity light beam coming from the optical element. In another embodiment, an aperture associated with the ambient light sensor is disposed to prevent the high-intensity light beam from entering the ambient light sensor. In another embodiment, a processor coupled to the ambient light sensor smoothes the peak associated with the high intensity light beam produced by the optical element.

8 Claims, 14 Drawing Sheets

AMBIENT LIGHT SENSOR

CROSS-REFERENCE TO RELATED APPLICATIONS

This application is a continuation of the U.S. patent application Ser. No. 15/233,811, filed Aug. 10, 2016 which is incorporated herein in its entirety and by this reference thereto.

TECHNICAL FIELD

The present application is related to ambient light sensing and, more specifically, to methods and systems that measure ambient light in the presence of optical elements.

BACKGROUND

Ambient light sensors are in ubiquitous use in mobile devices today. Ambient light sensors measure the brightness of the surrounding environment. They have an optical response closely approximating the optical response of the human eye, and are used to adjust the brightness of the screen based on the brightness of the surrounding environment. In low ambient light, the brightness of the mobile screen is set to low to save the mobile device battery, while in high ambient light the brightness of the mobile device screen is set to high to be visible to the human user. When the ambient light sensor is placed close to an optical element, such as close to the curved edge of the cover glass associated with the mobile device, the ambient light sensor makes inaccurate measurement of the surrounding light because the optical element either focuses incoming light toward or disperses incoming light from the ambient light sensor.

SUMMARY

Presented here are devices and methods to correct ambient light measurements made in the presence of optical elements, such as the curved edge of the cover glass associated with the mobile device. In one embodiment, a film with optical properties is placed within the ambient light sensor to diffuse the high-intensity light beam coming from the optical element. In another embodiment, an aperture associated with the ambient light sensor is disposed to prevent the high-intensity light beam from entering the ambient light sensor. In another embodiment, a processor coupled to the ambient light sensor smoothes the peak associated with the high-intensity light beam produced by the optical element.

BRIEF DESCRIPTION OF THE DRAWINGS

These and other objects, features and characteristics of the present embodiments will become more apparent to those skilled in the art from a study of the following detailed description in conjunction with the appended claims and drawings, all of which form a part of this specification. While the accompanying drawings include illustrations of various embodiments, the drawings are not intended to limit the claimed subject matter.

DETAILED DESCRIPTION

Terminology

Figure 1:
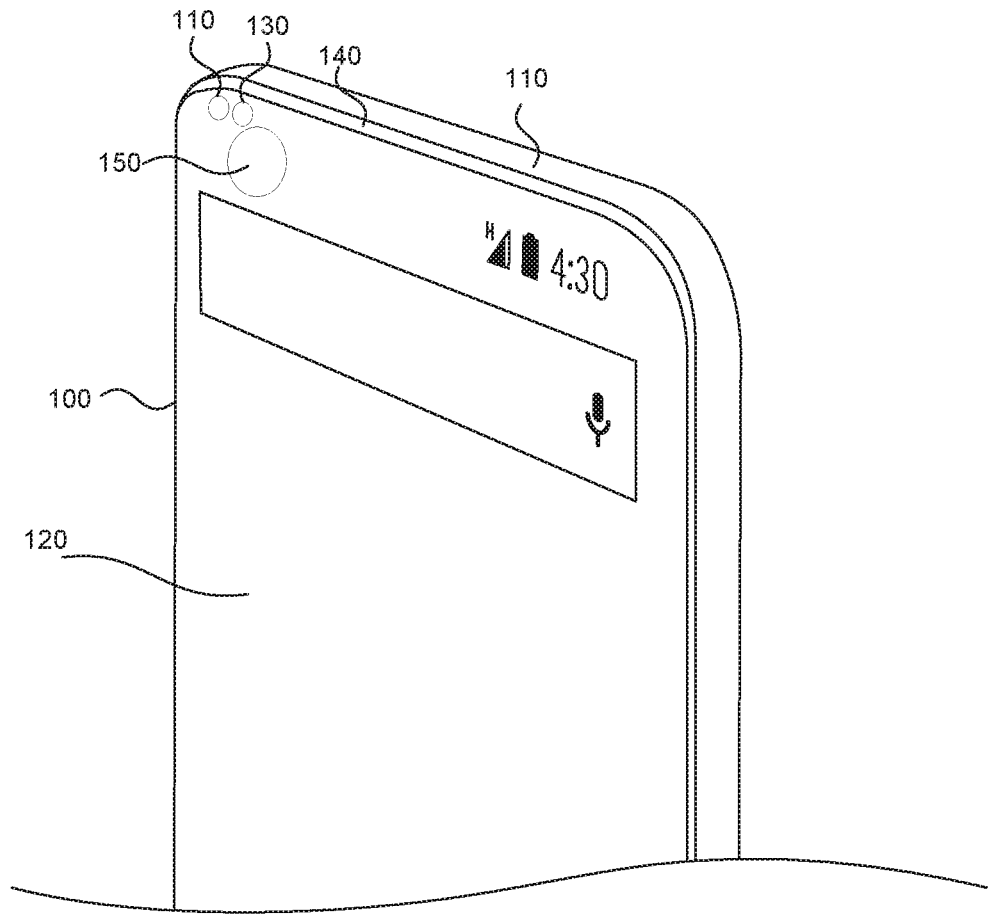
FIG. 1 shows a mobile device with an ambient light sensor disposed proximate to a light focusing element, according to one embodiment.

Brief definitions of terms, abbreviations, and phrases used throughout this application are given below.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described that may be requirements for some embodiments but not others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements. The coupling or connection between the elements can be physical, logical, or a combination thereof. For example, two devices may be coupled directly or via one or more intermediary channels or devices. As another example, devices may be coupled in such a way that information can be passed therebetween, while not sharing any physical connection with one another. Additionally, the words "herein," "above," "below," and words of similar import, when used in this application, shall refer to this application as a whole and not to any particular portions of this application. Where the context permits, words in the Detailed Description using the singular or plural number may also include the plural or singular number respectively. The word "or," in reference to a list of two or more items, covers all of the following interpretations of the word: any of the items in the list, all of the items in the list, and any combination of the items in the list.

If the specification states a component or feature "may," "can," "could," or "might" be included or have a characteristic, that particular component or feature is not required to be included or have the characteristic.

The term "module" refers broadly to software, hardware, or firmware components (or any combination thereof). Modules are typically functional components that can generate useful data or another output using specified input(s). A module may or may not be self-contained. An application program (also called an "application") may include one or more modules, or a module may include one or more application programs.

The terminology used in the Detailed Description is intended to be interpreted in its broadest reasonable manner, even though it is being used in conjunction with certain examples. The terms used in this specification generally have their ordinary meanings in the art, within the context of the disclosure, and in the specific context where each term is used. For convenience, certain terms may be highlighted, for example, using capitalization, italics, and/or quotation marks. The use of highlighting has no influence on the scope and meaning of a term; the scope and meaning of a term is the same, in the same context, whether or not it is highlighted. It will be appreciated that the same element can be described in more than one way.

Consequently, alternative language and synonyms may be used for any one or more of the terms discussed herein, but special significance is not to be placed upon whether or not a term is elaborated or discussed herein. A recital of one or more synonyms does not exclude the use of other synonyms. The use of examples anywhere in this specification, including examples of any terms discussed herein, is illustrative only and is not intended to further limit the scope and meaning of the disclosure or of any exemplified term. Likewise, the disclosure is not limited to various embodiments given in this specification.

Technology

Presented here are devices and methods to correct ambient light measurements made in the presence of optical elements, such as the curved edge of the cover glass associated with the mobile device. In one embodiment, a film with optical properties is placed within the ambient light sensor to diffuse the high-intensity light beam coming from the optical element. In another embodiment, an aperture associated with the ambient light sensor is disposed to prevent the high-intensity light beam from entering the ambient light sensor. In another embodiment, a processor coupled to the ambient light sensor smoothes the peak associated with the high-intensity light beam produced by the optical element.

FIG. 1 shows a mobile device with an ambient light sensor disposed proximate to a light focusing element, according to one embodiment. An electronic device 100, such as a cell phone, a tablet, a personal digital assistant (PDA), a desktop computer, a laptop computer, etc., includes a display 120 that substantially covers the whole front side of the electronic device. The camera 150, integrated into the display 120, is placed proximate to the ambient light sensor 110 and the proximity sensor 130. The display 120 includes a cover with a curved edge 140. The cover is made out of optically transparent material, such as glass or plastic, allowing rays of light to pass between the electronic device 100 and the outside environment. The curved edge 140 acts as a convex lens focusing passing rays of light towards the interior of the phone. The ambient light sensor 110 is placed close to the curved edge 140 of the display 120 covering the whole front side of the electronic device 100 to minimize the visual impact of the ambient light sensor 110 and the proximity sensor 130 on the display 120. As a result, the curved edge 140 creates a focused light beam of high light intensity and transmits the focused light beam to the ambient light sensor 110, thus causing the ambient light sensor to produce an incorrect measurement of the ambient light intensity.

Figure 2A:
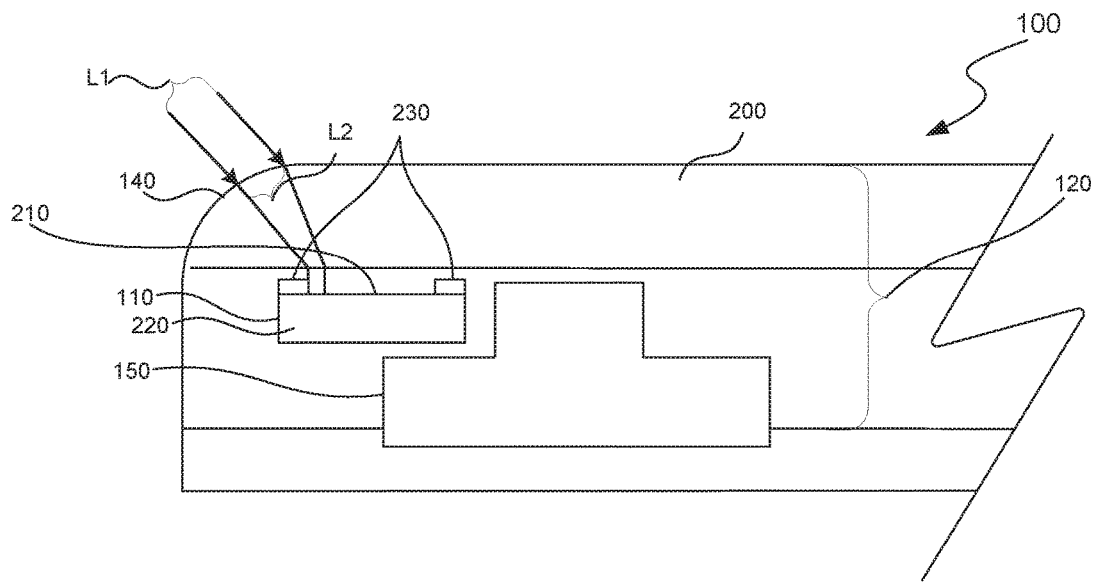
FIG. 2A is a side view of the ambient light sensor and the camera disposed proximate to a light focusing element, according to one embodiment.

FIG. 2A is a side view of the ambient light sensor and the camera disposed proximate to a light focusing element, according to one embodiment. The display 120 includes a light focusing element 200, such as an optically transparent cover associated with the display 120. The light focusing element 200 includes a curved edge 140 which acts as a convex lens focusing incoming light beam L1 to produce a focused light beam L2 of high light intensity. The ambient light sensor 110 is placed proximate to the curved edge 140. The ambient light sensor includes an aperture 210, an aperture frame 230, and a photodiode 220. The aperture frame 230 defines the aperture 210. The aperture 210 allows the focused light beam L2 to pass into the photodiode 220. Camera 150 is placed proximate to the ambient light sensor 110 and integrated into the display 120.

Figure 2B:
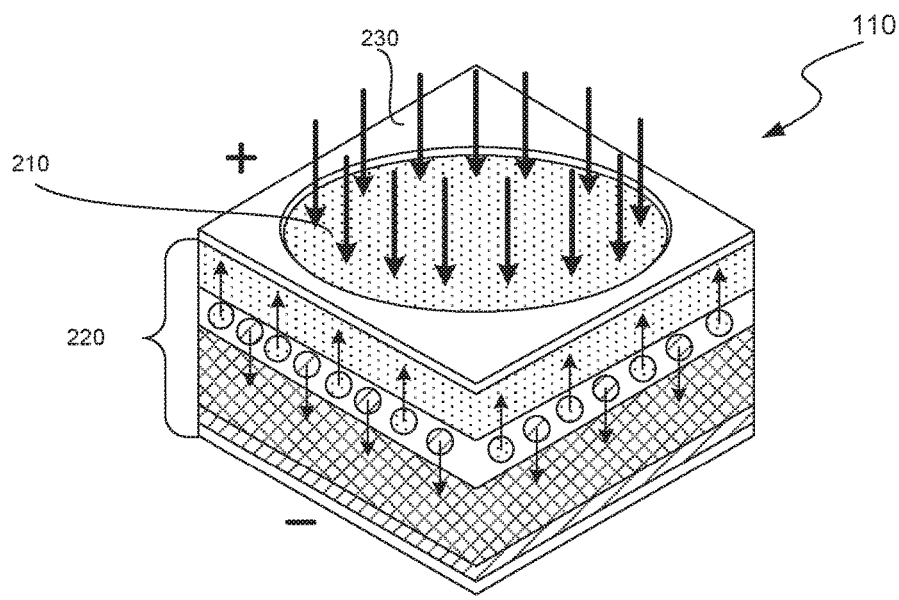
FIG. 2B shows an ambient light sensor, according to one embodiment.

FIG. 2B shows an ambient light sensor, according to one embodiment. The ambient light sensor 110 includes the aperture 210, the aperture frame 230, and the photodiode 220. The aperture frame 230 defines the aperture 210 and is disposed on top of the photodiode 220. The aperture 210 can take on various shapes, such as a circle, a rectangle, a parallelogram, etc. The aperture 210 allows light from the surrounding environment to pass into the photodiode 220, which converts the incident light into electric current.

Figure 3:
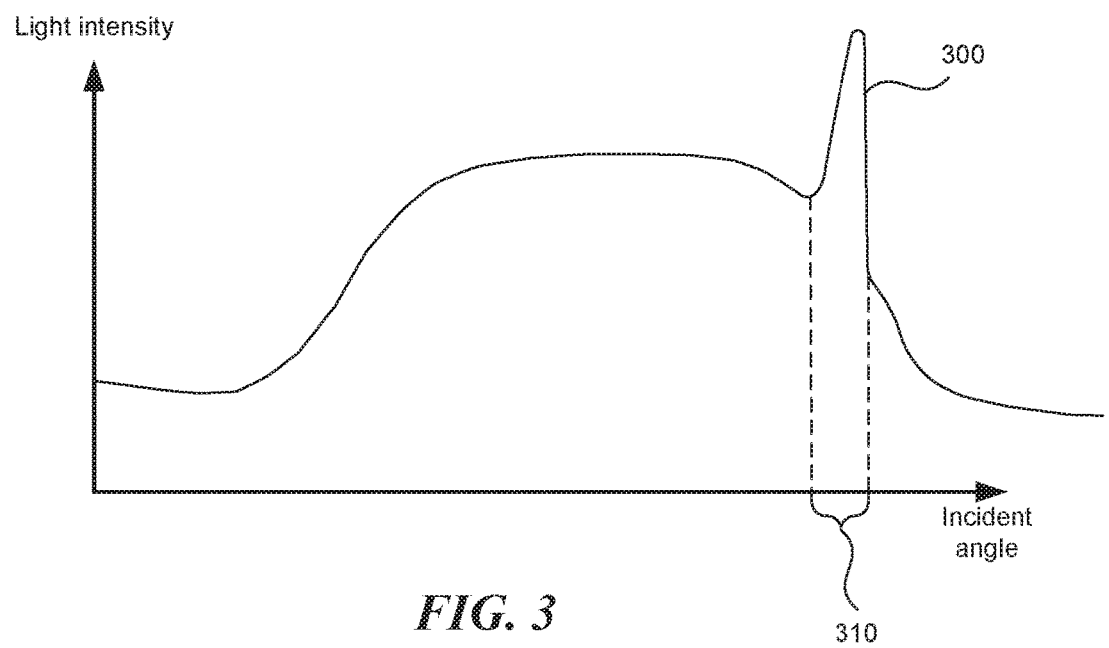
FIG. 3 shows a graph of the ambient light sensor measurement of incoming light when the ambient light sensor is placed proximate to a light focusing element, according to one embodiment.

FIG. 3 shows a graph of the ambient light sensor measurement of incoming light when the ambient light sensor is placed proximate to a light focusing element, according to one embodiment. In the graph, the X-axis is the incident angle of the incoming light, while the Y-axis is the light intensity measured by the ambient light sensor. A light intensity peak 300 corresponds to the measured light intensity associated with the focused light beam L2 in FIG. 2A. The incident angle range 310 corresponds to the light intensity peak 300.

Figure 4A:
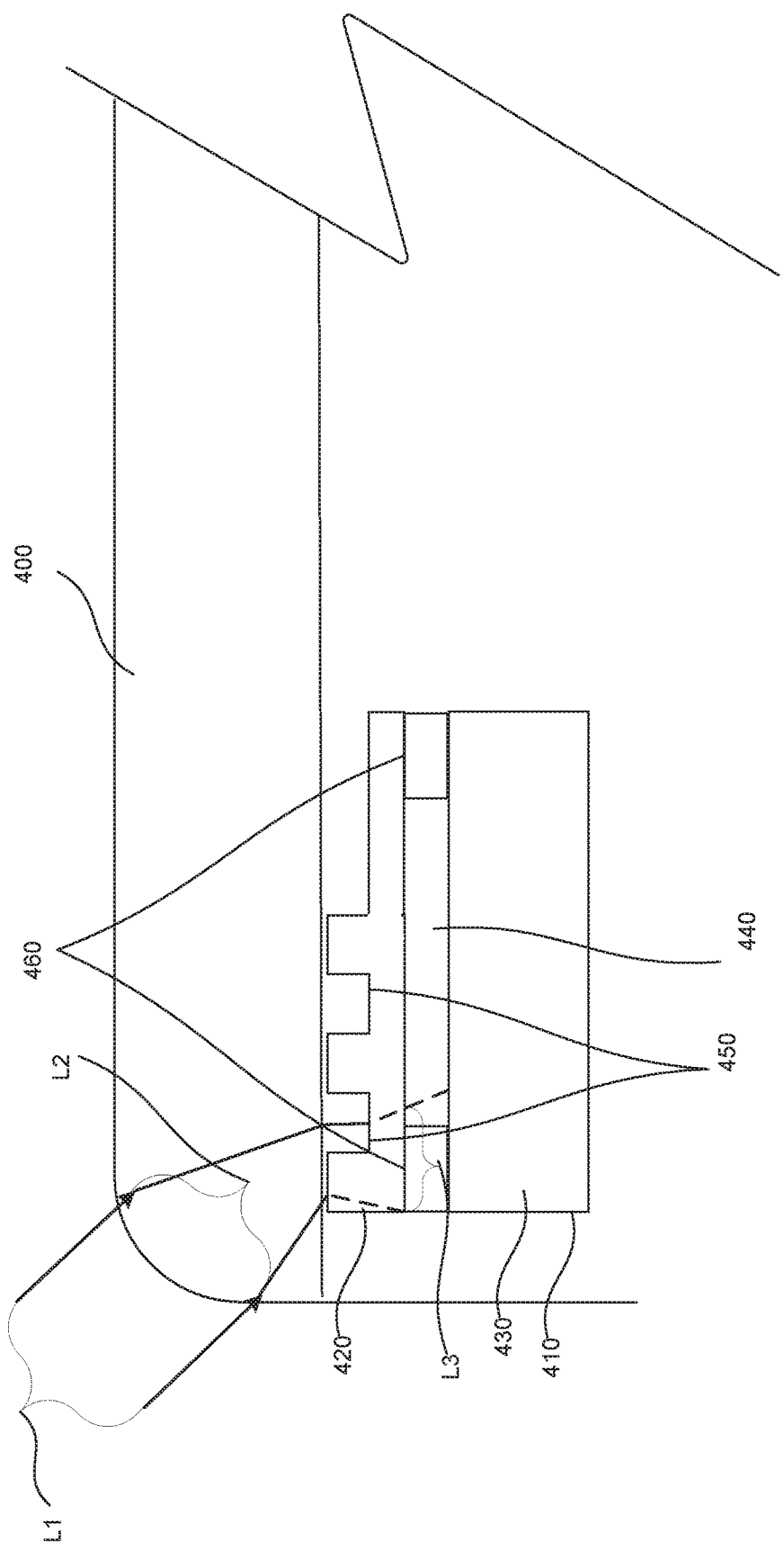
FIGS. 4A-4C show an apparatus to measure ambient light intensity, the apparatus disposed proximate to a light focusing element, according to various embodiments.
Figure 4B:
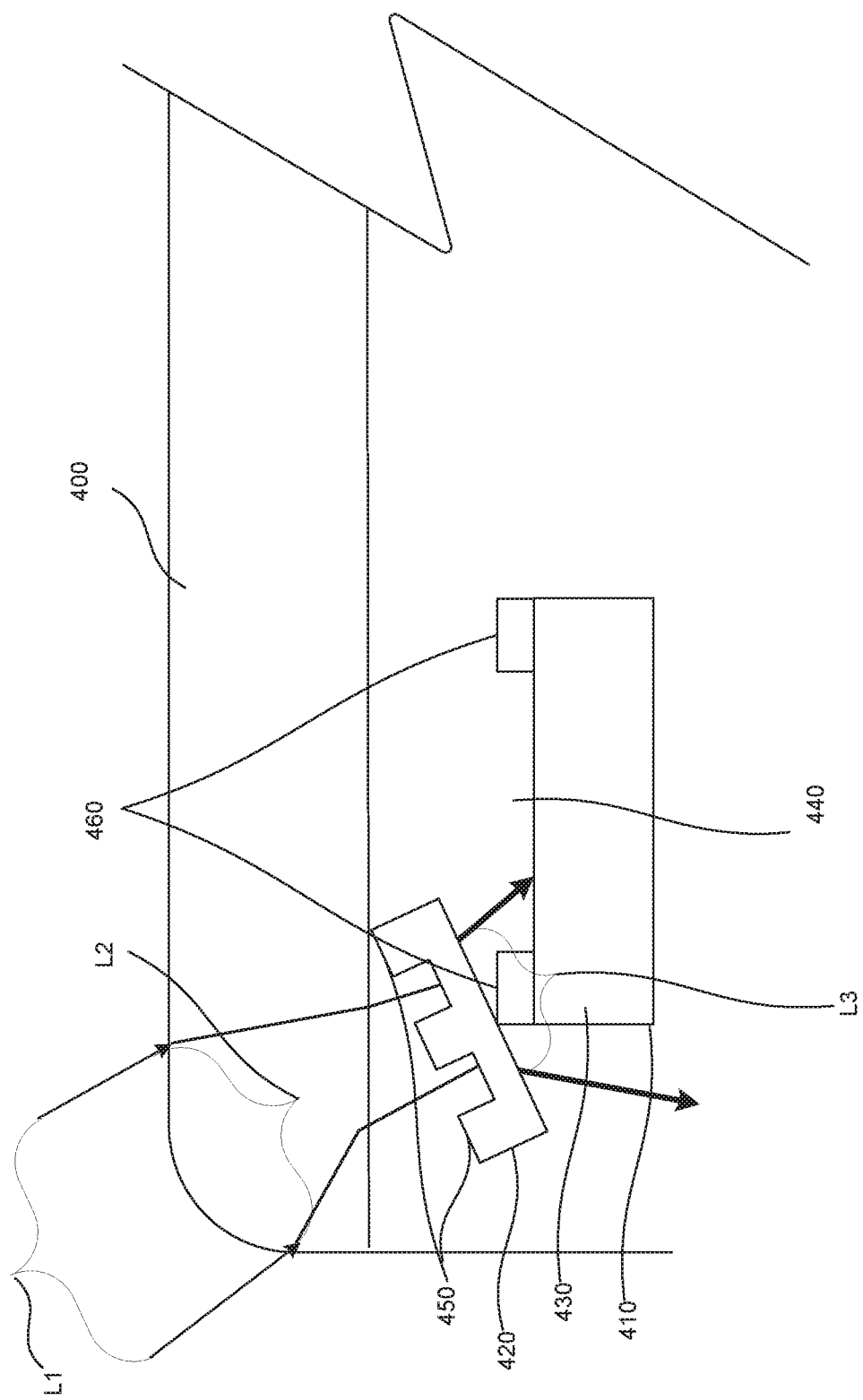
Figure 4C:
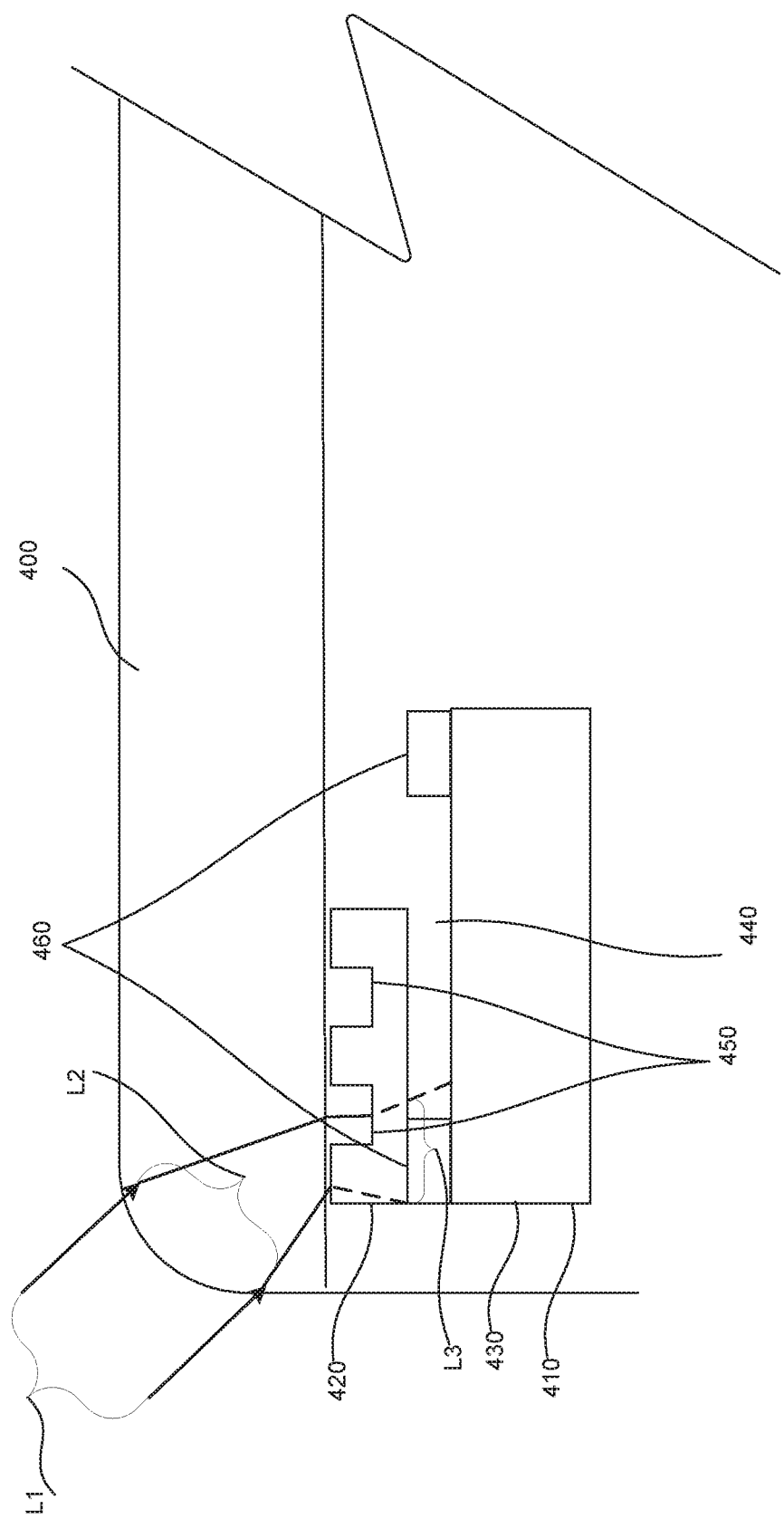

FIGS. 4A-4C show an apparatus to measure ambient light intensity, the apparatus disposed proximate to a light focusing element, according to various embodiments. The light focusing element 400 focuses incoming light beam L1 toward an ambient light sensor 410 to produce a focused light beam L2 comprising a high light intensity. The ambient light sensor 410 is proximate to the light focusing element 400. The ambient light sensor 410 includes a film 420, an aperture 440, and the photodiode 430. The film 420 can be disposed between the light focusing element 400 and the aperture 440, the film 420 can be disposed between the aperture 440 and the photodiode 430, or the film 420 can be integrated into the aperture 440. The film 420 acts to ameliorate the high light intensity associated with the focused light beam L2.

In some embodiments, the film 420 can be integrated into the aperture 440. For example, the aperture 440 and the aperture frame 460 can be part of the film 420 such that the aperture 440 is optically transparent, while the aperture frame 460 is optically opaque. A portion of the aperture 440 receiving the focused light beam L2 can be formed to contain diffraction grating described herein.

In one embodiment, the film 420 includes a diffraction grating with a plurality of parallel grooves 450. The plurality of parallel grooves 450 receives the focused light beam L2 and produces a divergent light beam L3 in FIG. 4B. The divergent light beam L3 can be partially directed away from the ambient light sensor 410, as shown in FIG. 4B. The plurality of parallel grooves 450 can have varying densities. For example, the density of the parallel grooves proximate to the light focusing element 400 can be higher than the density of the parallel grooves further away from the light focusing element 400. In one embodiment, the film 420 does not have any grooves in the region further away from the light focusing element 400, as shown in FIG. 4A. In another embodiment, the film 420 only partially covers the photodiode 430, as shown in FIG. 4C.

As shown in FIG. 4B, the film 420 can be angularly disposed between the light focusing element 400 and the photodiode 430 such that the film 420 subtends the focused light beam L2 and acts as a concave lens to produce the divergent light beam L3. The divergent light beam L3 can be partially directed away from the photodiode 430. In other embodiments, the film 420 can be a divergent lens producing the divergent light beam L3.

Figure 5:
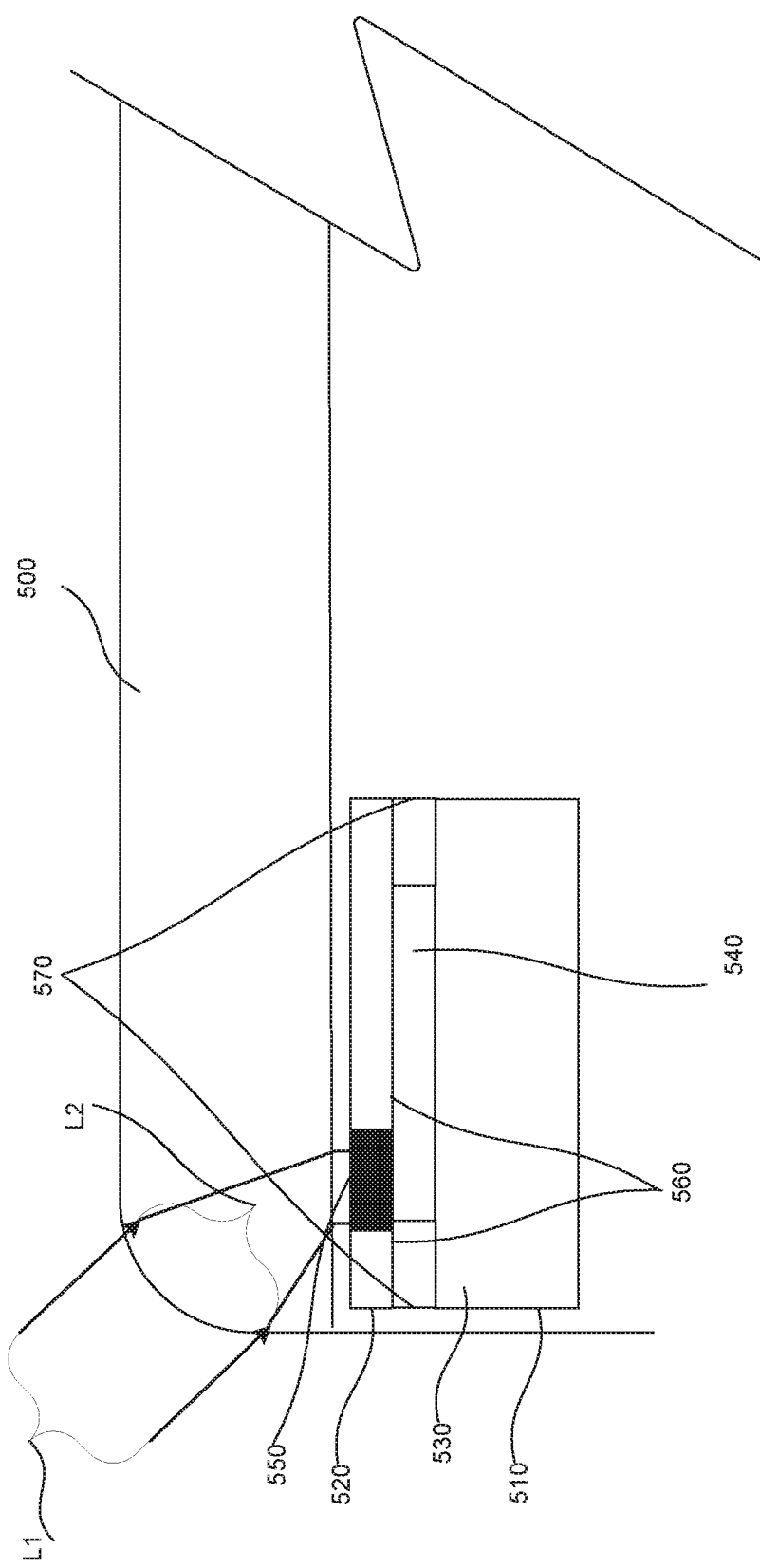
FIG. 5 shows an apparatus to measure ambient light intensity, the apparatus disposed proximate to a light focusing element, according to another embodiment.

FIG. 5 shows an apparatus to measure ambient light intensity, the apparatus disposed proximate to a light focusing element, according to another embodiment. The light focusing element 500 focuses incoming light beam L1 toward an ambient light sensor 510 to produce a focused light beam L2 comprising a high light intensity. The ambient light sensor 510 is proximate to the light focusing element 500. The ambient light sensor 510 includes a film 520, an aperture 540, and the photodiode 530. The film 520 can be disposed between the light focusing element 500 and the aperture 540, the film 520 can be disposed between the aperture 540 and the photodiode 530, or the film 520 can be integrated into the aperture 540. The film 520 acts to ameliorate the high light intensity associated with the focused light beam L2.

In some embodiments, the film 520 can be integrated into the aperture 540. For example, the aperture 540 and the aperture frame 570 can be part of the film 520 such that the aperture 540 is optically transparent, while the aperture frame 570 is optically opaque. A portion of the aperture 540 receiving the focused light beam L2 can be formed to contain an optically opaque region 550, as described herein.

The film 520 includes an optically opaque region 550 which prevents the focused light beam L2 from entering the ambient light sensor 510. The optically opaque region 550 can be the sole region associated with the film 520. Alternatively, the film 520 can include an optically transparent region 560 partially or wholly (as shown in FIG. 5) covering the ambient light sensor 510.

Figure 6A:
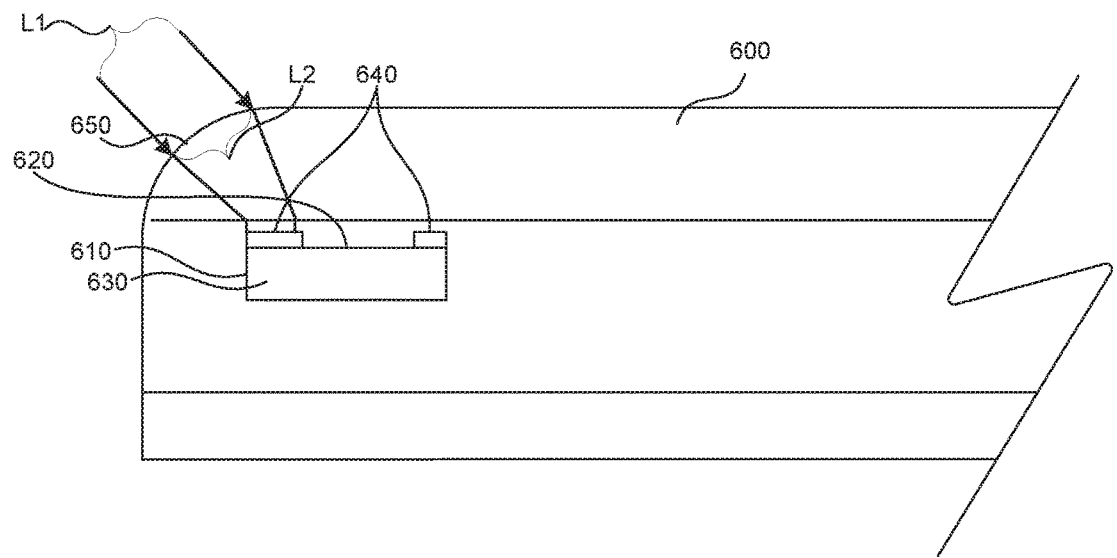
FIG. 6A is a side view of an apparatus to measure ambient light intensity by blocking a focused light beam associated with a light focusing element, according to one embodiment.

FIG. 6A is a side view of an apparatus to measure ambient light intensity by blocking a focused light beam associated with a light focusing element, according to one embodiment. The light focusing element 600 focuses incoming light beam L1 toward an ambient light sensor 610 to produce a focused light beam L2 of a high light intensity. The light focusing element 600 can be an optically transparent cover glass associated with an electronic display. The cover glass includes a curved portion 650, which acts as a convex lens focusing incoming light beam L1 into the focused light beam L2 toward the ambient light sensor 610.

The ambient light sensor 610 proximate to the light focusing element 600 includes an aperture frame 640, an aperture 620, and a photodiode 630. The aperture frame 640 defines the aperture 620 and is disposed on top of the photodiode 630. The aperture frame 640 blocks the focused light beam L2 from reaching the photodiode 630. The aperture 620 transmits ambient light and ameliorates the high light intensity associated with the focused light beam L2. The photodiode 630 coupled to the aperture 620 measures the ambient light intensity.

Figure 6B:
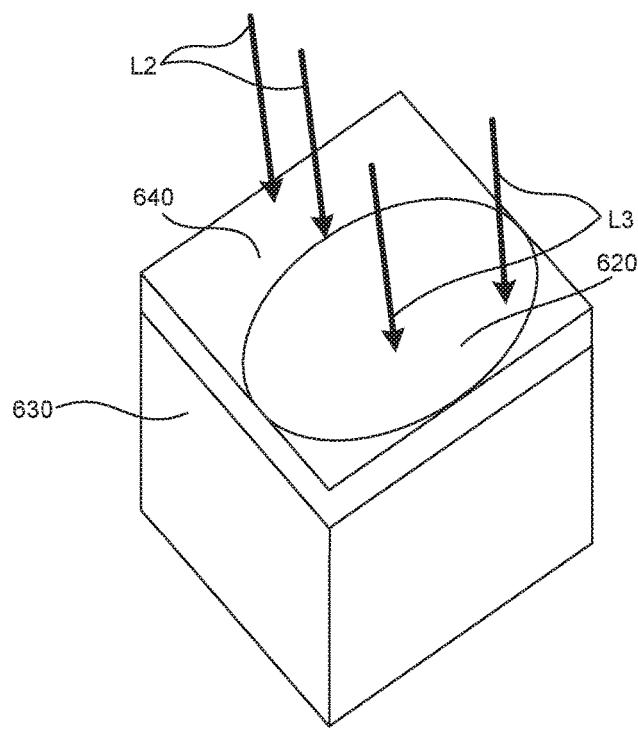
FIG. 6B is a three-quarters view of the aperture associated with the ambient light sensor, preventing the focused light beam from entering the aperture, according to one embodiment.

FIG. 6B is a three-quarters view of the aperture associated with the ambient light sensor, preventing the focused light beam from entering the aperture, according to one embodiment. The aperture 620 is formed into a shape preventing the focused light beam L2 from entering the aperture. A center of the aperture 620 is offset from a center of the photodiode 630 such that the aperture frame 640, surrounding the aperture 620, blocks the focused light beam L2 from entering the photodiode 630, while allowing ambient light L3 to enter the photodiode 630. The aperture 620 is asymmetrically disposed within the aperture frame 640. The aperture 620 can take on various shapes such as an ellipse, a rectangle, a polygon, etc.

The ambient light sensor described in FIGS. 6A-6B can be combined with the diffraction grating and the optically opaque film described herein. In addition, the ambient light sensor described in FIGS. 6A-6B can be combined with a processor to fill in the ambient light measurements in the regions where the ambient light is blocked by the aperture frame 640. The processor can be associated with the ambient light sensor 610, or can be a remote processor, such as a processor associated with the mobile device 100 in FIG. 1.

Figure 6C:
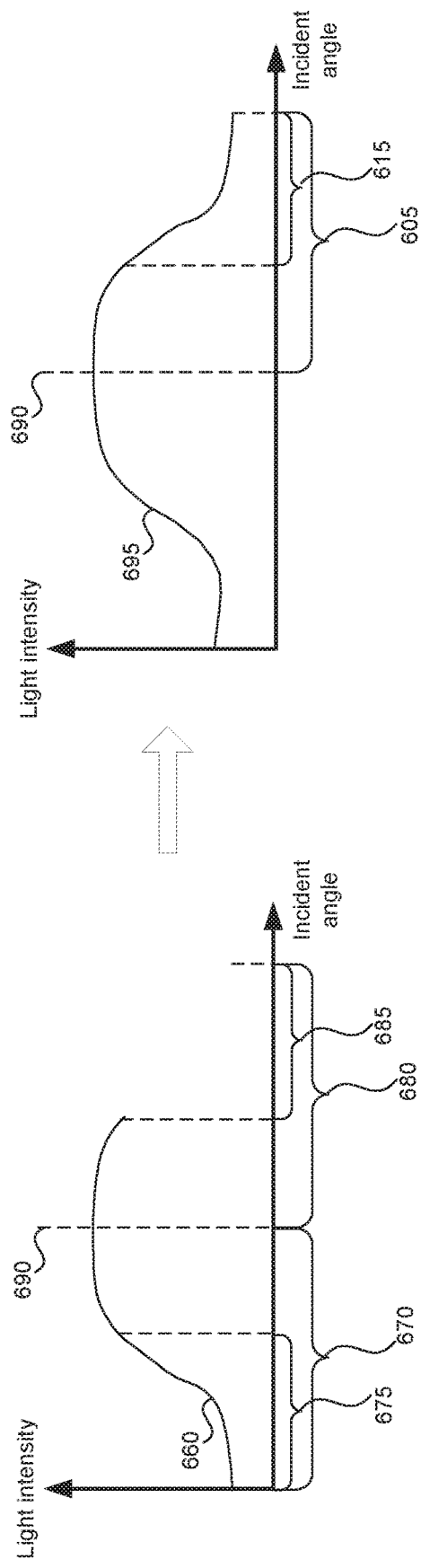
FIG. 6C shows a partial ambient light signal transformed into a full ambient light signal, according to one embodiment.

FIG. 6C shows a partial ambient light signal transformed into a full ambient light signal, according to one embodiment. The processor receives a partial ambient light signal 660 from the ambient light sensor. The partial ambient light signal 660 correlates an incident angle to a light intensity measurement. The partial ambient light signal comprises a first portion and a second portion. The first portion can vary within the ranges 680, 685, and includes a first range of incident angles partially lacking the light intensity measurement, 685. The second portion can vary within the ranges 670, 675, and includes a second range of incident angles symmetric to the first range of incident angles with respect to a vertical axis 690 corresponding to the incident angle associated with light perpendicularly entering the ambient light sensor.

Based on the partial ambient light signal, the processor determines the light intensity measurement lacking in the first portion associated with the partial ambient light signal 660 to obtain a full ambient light signal 695. The processor replaces to the first portion associated with the partial ambient light signal with a reflected second portion. The reflected second portion can vary within the ranges 605, 615 and includes the second portion reflected along the vertical axis 690 corresponding to the incident angle associated with light perpendicularly entering the ambient light sensor. For example, if the second portion comprises the range 670, the reflected second portion comprises the range 605. If the second portion comprises the range 675, the reflected second portion comprises the range 615.

Figure 7:
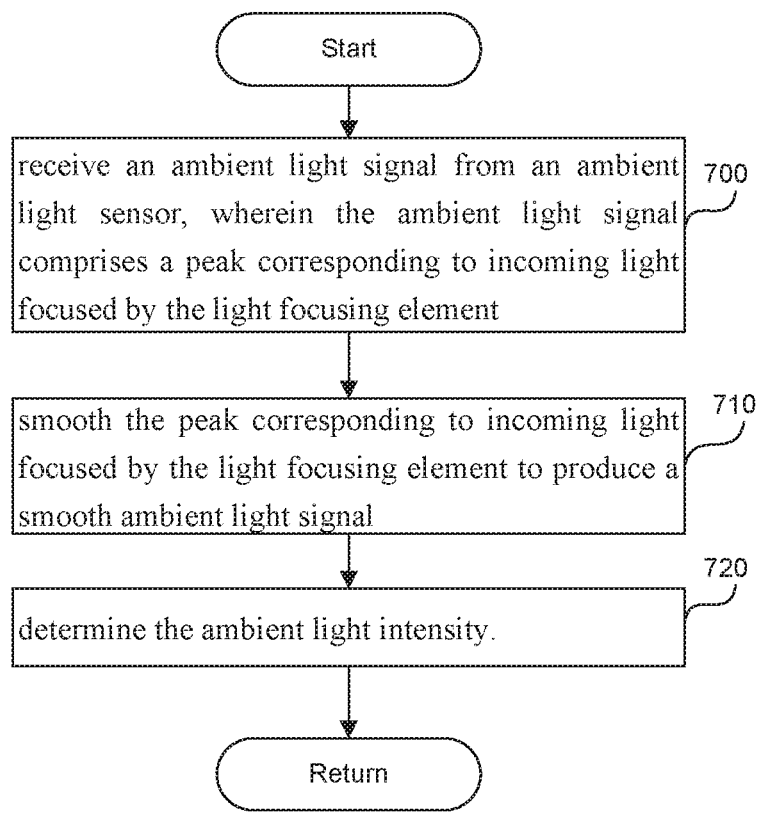
FIG. 7 is a flowchart of a method to correct an ambient light intensity measurement made proximate to a light focusing element, according to one embodiment.

FIG. 7 is a flowchart of a method to correct an ambient light intensity measurement made proximate to a light focusing element, according to one embodiment. In step 700, a processor receives an ambient light signal from an ambient light sensor. The ambient light signal correlates an incident angle of light to a light intensity. The ambient light signal comprises a peak corresponding to incoming light focused by the light focusing element. The peak comprises a high frequency signal.

In step 710, the processor smoothes the peak corresponding to incoming light focused by the light focusing element to produce a smooth ambient light signal. In step 720, the processor determines the ambient light intensity.

The processor can perform step 710 in various ways. In one embodiment, the processor performs a low-pass filter operation on the ambient light signal to remove the high frequency corresponding to the peak and to produce the smooth ambient light signal.

Figure 8:
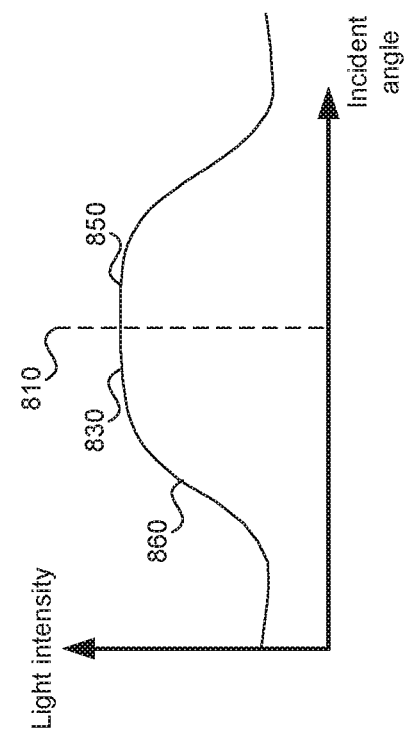
FIG. 8 shows the ambient light signal, divided along the vertical axis corresponding to the perpendicular incident angle, according to one embodiment.
Figure 8:
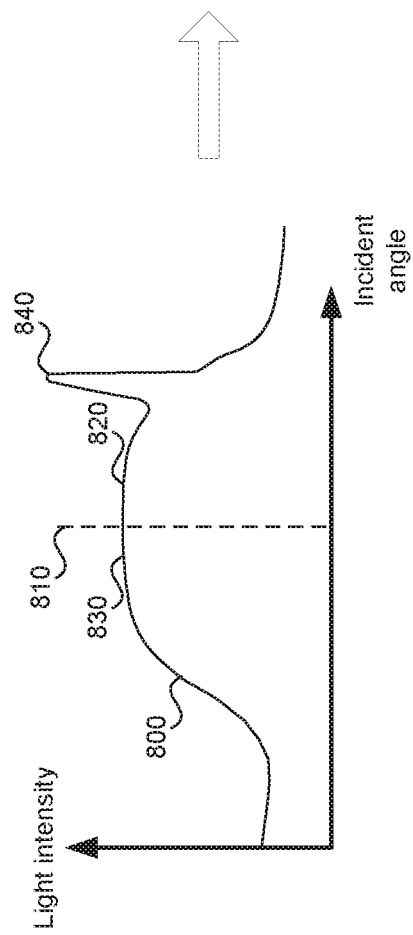

In another embodiment, in step 710 of FIG. 7, the processor divides the ambient light signal into a first portion and a second portion along a vertical axis corresponding to the incident angle associated with light perpendicularly entering the ambient light sensor. FIG. 8 shows the ambient light signal 800 divided along the vertical axis 810 corresponding to the perpendicular incident angle, according to one embodiment. Dividing the ambient light signal 800 along the vertical axis 810 produces the first portion 820 and the second portion 830. The first portion 820 comprises the incident angle corresponding to the peak 840 associated with the ambient light signal 800. The second portion 830 comprises a smooth portion associated with the ambient light signal 800. The processor replaces the first portion 820 associated with the ambient light signal 800 with a reflected second portion 850 to obtain the smooth ambient light signal 860. The reflected second portion 850 is the second portion 830 reflected along the vertical axis 810.

Figure 9:
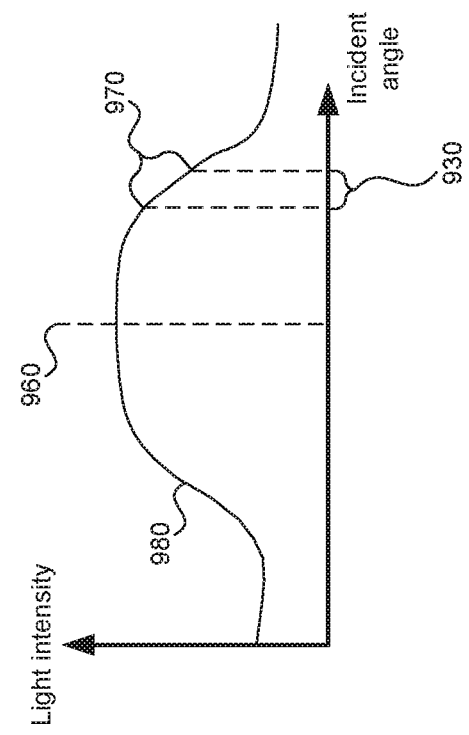
FIG. 9 shows the ambient light signal, the first portion associated with the ambient light signal and the second portion associated with the ambient light signal, according to one embodiment.
Figure 9:
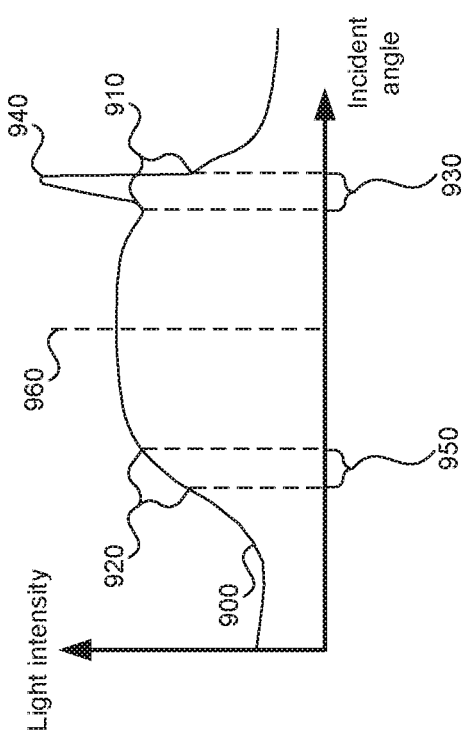

In another embodiment, in step 710 of FIG. 7, to smooth the peak in the ambient light signal, the processor determines a first portion associated with the ambient light signal and a second portion associated with the ambient light signal. FIG. 9 shows the ambient light signal 900, the first portion 910 associated with the ambient light signal 900, and the second portion 920 associated with the ambient light signal 900, according to one embodiment. The first portion 910 includes a first range of incident angles 930 corresponding to the peak 940 associated with the ambient light signal 900. The second portion 920 includes a second range of incident angles 950 symmetric to the first range of incident angles 930 with respect to a vertical axis 960 corresponding to the incident angle associated with the light perpendicularly entering the ambient light sensor.

The processor replaces the first portion 910 associated with the ambient light signal 900 with a reflected second portion 970 to obtain a smooth ambient light signal 980. The reflected second portion 970 is the second portion 920 reflected along the vertical axis 960 corresponding to the incident angle associated with the light perpendicularly entering the ambient light sensor.

Figure 10:
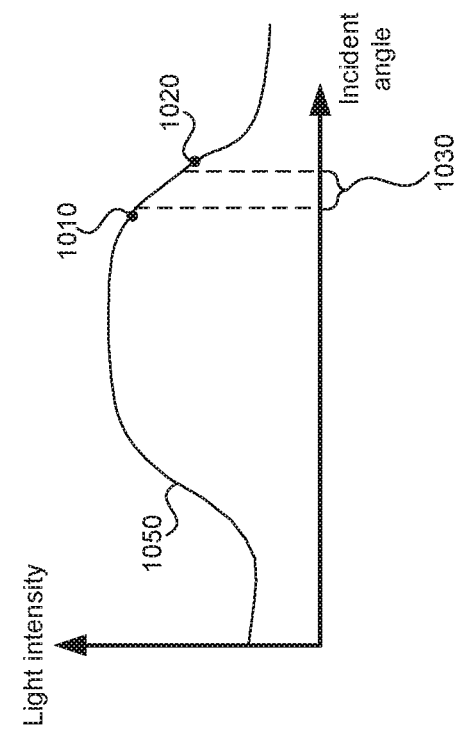
FIG. 10 shows the result of interpolating between two points associated with the ambient light signal, according to one embodiment.
Figure 10:
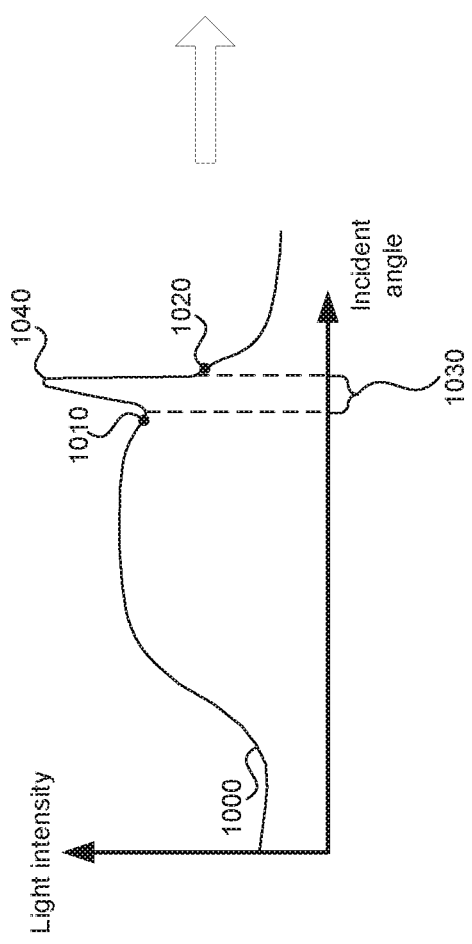

In another embodiment, in step 710 of FIG. 7, the processor interpolates between at least two points outside of the range of incident angles corresponding to the peak. FIG. 10 shows the result of interpolating between the at least two points 1010, 1020 associated with the ambient light signal 1000, according to one embodiment. When the ambient signal is more than two-dimensional, such as three-dimensional, four-dimensional, etc., the number of points needed for interpolation increases to 6, 8, etc., respectively. The interpolation can be linear, polynomial, spline, Gaussian, etc.

First, the processor determines the at least two points 1010, 1020 such that the at least two points 1010, 1020 are outside of the range of incident angles 1030 associated with the peak 1040, while the at least two points 1010, 1020 are associated with the ambient light signal 1000. The at least two points 1010, 1020 can be placed anywhere on the ambient light signal 1000; however, the closer the at least two points 1010, 1020 are to the peak 1040, the more accurate the ambient light signal interpolation is. Next, the processor interpolates between the at least two points 1010, 1020 and discards the points associated with the peak 1040 to produce a smooth ambient light signal 1050.

Computer

Figure 11:
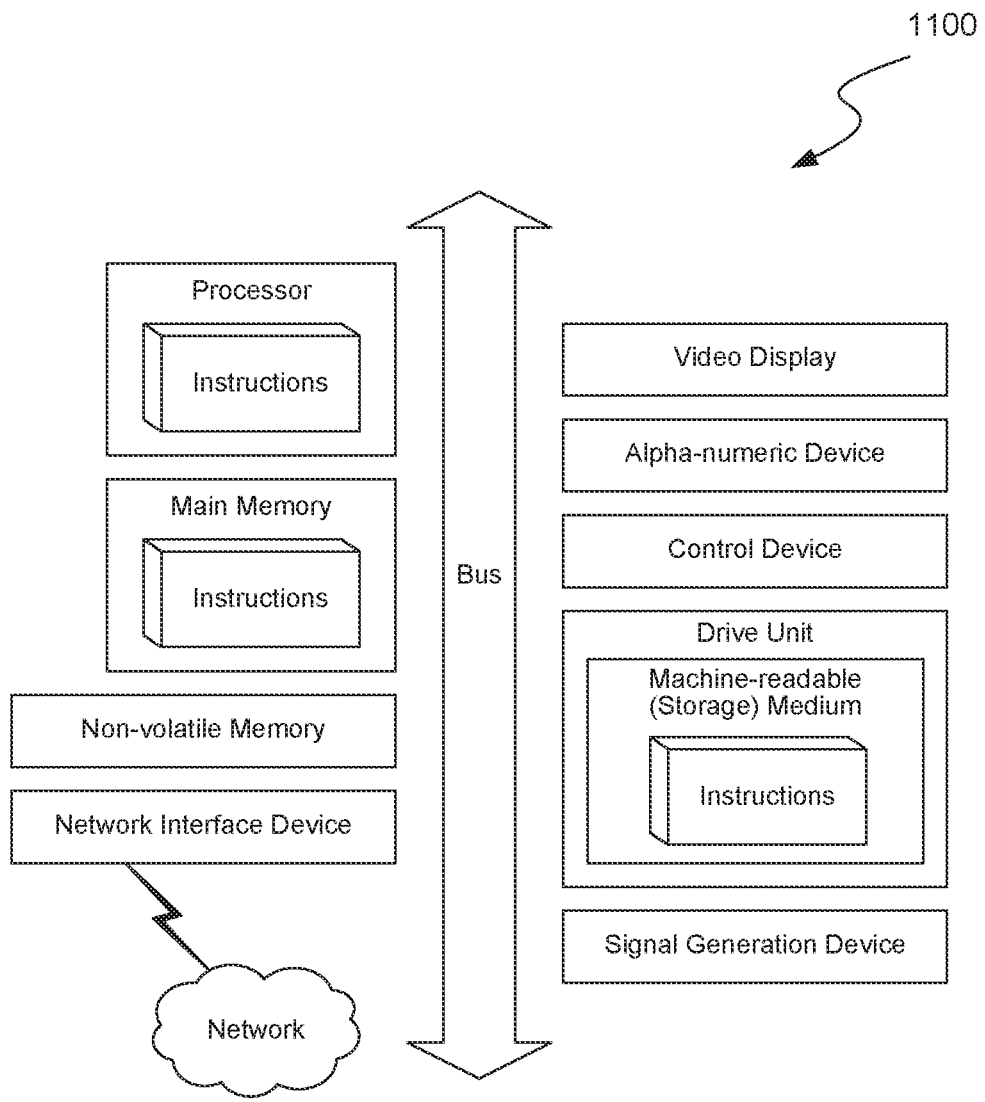
FIG. 11 is a diagrammatic representation of a machine in the example form of a computer system 1100 within which a set of instructions, for causing the machine to perform any one or more of the methodologies or modules discussed herein, may be executed.

FIG. 11 is a diagrammatic representation of a machine in the example form of a computer system 1100 within which a set of instructions, for causing the machine to perform any one or more of the methodologies or modules discussed herein, may be executed.

In the example of FIG. 11, the computer system 1100 includes a processor, memory, non-volatile memory, and an interface device. Various common components (e.g., cache memory) are omitted for illustrative simplicity. The computer system 1100 is intended to illustrate a hardware device on which any of the components described in the examples of FIGS. 1-10 (and any other components described in this specification) can be implemented. The computer system 1100 can be of any applicable known or convenient type. The components of the computer system 1100 can be coupled together via a bus or through some other known or convenient device.

This disclosure contemplates the computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 1100 may include one or more computer systems 1100, be unitary or distributed, span multiple locations, span multiple machines, or reside in a cloud, which may include one or more cloud components in one or more networks. Where appropriate, one or more computer systems 1100 may perform, without substantial spatial or temporal limitation, one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

The processor may be, for example, a conventional microprocessor such as an Intel Pentium microprocessor or Motorola PowerPC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random-access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic optical disk; an optical disk; a read-only memory (ROM), such as a CD-ROM, EPROM, or EEPROM; a magnetic or optical card; or another form of storage for large amounts of data. Some of this data is often written, by a direct memory access process, into memory during execution of software in the computer 1100. The non-volatile storage can be local, remote, or distributed. The non-volatile memory is optional because systems can be created with all applicable data available in memory. A typical computer system will usually include at least a processor, a memory, and a device (e.g., a bus) coupling the memory to the processor.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more modems or network interfaces. It will be appreciated that a modem or network interface can be considered to be part of the computer system 1100. The interface can include an analog modem, ISDN modem, cable modem, token ring interface, satellite transmission interface (e.g. "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted in the example of FIG. 11 reside in the interface.

In operation, the computer system 1100 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable-type media such as volatile and non-volatile memory devices, floppy and other removable disks, hard disk drives, optical disks (e.g., compact disc read-only memory (CD-ROMs), digital versatile discs (DVDs), etc.), among others, and transmission type media such as digital and analog communication links.

In some circumstances, operation of a memory device, such as a change in state from a binary one to a binary zero or vice versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling others skilled in the relevant art to understand the claimed subject matter, the various embodiments, and the various modifications that are suited to the particular uses contemplated.

While embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details, while still being encompassed by the specification. As noted above, particular terminology used when describing certain features or aspects of various embodiments should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless those terms are explicitly defined herein. Accordingly, the actual scope of the invention encompasses not only the disclosed embodiments, but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the invention be limited not by this Detailed Description, but rather by any claims that issue on an application based hereon. Accordingly, the disclosure of various embodiments is intended to be illustrative, but not limiting, of the scope of the embodiments, which is set forth in the following claims.

The invention claimed is:

1. An apparatus with an increased display area, the apparatus comprising:
   an ambient light sensor that measures ambient light intensity;
   a light focusing element comprising a substantially curved focusing surface positioned proximate to the ambient light sensor, the light focusing element to receive ambient light and to focus ambient light onto the ambient light sensor;
   a processor coupled to the ambient light sensor, the processor configured to:
      receive a signal from the ambient light sensor comprising a peak corresponding to ambient light focused onto the ambient light sensor by the light focusing element, the peak comprising a high frequency, the signal correlating an incident angle of ambient light to a light intensity, the incident angle of ambient light defined with respect to the ambient light sensor;

determine a plurality of points associated with the signal such that the plurality of points are outside the peak associated with the signal;

replace the peak with a plurality of values interpolated based on the plurality of points to produce a smooth signal; and based on the smooth signal, determine ambient light intensity.

2. The apparatus of claim 1, the processor configured to perform a low-pass filter operation on the signal to remove the high frequency corresponding to the peak and to produce the smooth signal.

3. An apparatus with an increased display area, the apparatus comprising:

a light focusing element comprising a substantially curved focusing surface to receive ambient light, to focus ambient light, and to produce a focused light beam comprising a high light intensity, the light focusing element comprising a curved portion of a cover glass associated with an electronic display;

an ambient light sensor positioned proximate to the light focusing element, the ambient light sensor to receive the focused light beam from the light focusing element, the ambient light sensor comprising:

a film disposed between the light focusing element and a photodiode, the film to ameliorate the high light intensity associated with the focused light beam, the film comprising an optically opaque region, the optically opaque region disposed within the film to prevent the focused light beam from entering the ambient light sensor; and the photodiode coupled to the film, the photodiode to measure ambient light intensity.

4. An apparatus with an increased display area, the apparatus comprising:

a light focusing element comprising a substantially curved focusing surface to receive ambient light, to focus ambient light, and to produce a focused light beam comprising a high light intensity, the light focusing element comprising a curved portion of a cover glass associated with an electronic display;

an ambient light sensor positioned proximate to the light focusing element, the ambient light sensor to receive the focused light beam from the light focusing element, the ambient light sensor comprising:

an aperture frame defining an aperture, the aperture frame disposed on top of a photodiode, the aperture frame to block the focused light beam from reaching the photodiode; the aperture asymmetrically disposed within the aperture frame, the aperture to transmit ambient light, the aperture formed into a shape preventing the focused light beam from entering the aperture; a film disposed between the light focusing element and the aperture, comprising an optically opaque region, the optically opaque region disposed within the film to prevent the focused light beam from entering the ambient light sensor; and the photodiode coupled to the aperture, the photodiode to measure ambient light intensity.

5. A method to increase display area of a device, the method comprising:

receiving a signal from an ambient light sensor, wherein the signal correlates an incident angle of ambient light to a light intensity, the incident angle of ambient light defined with respect to the ambient light sensor, wherein the signal comprises a peak corresponding to incoming light focused by a light focusing element comprising a substantially curved focusing surface, and wherein the peak comprises a high frequency; smoothing the peak corresponding to incoming light focused by the light focusing element to produce a smooth signal, said smoothing the peak comprising: determining a plurality of points associated with the signal such that the plurality of points are outside the peak associated with the signal; replacing the peak with values interpolated based on the plurality of points; and based on the smooth signal, determining ambient light intensity.

6. The method of claim 5, said smoothing the peak comprising: performing a low-pass filter operation on the signal to remove the high frequency corresponding to the peak, and to produce the smooth signal.

7. An apparatus to measure ambient light intensity the apparatus comprising: an ambient light sensor that measures ambient light intensity;

a light focusing element positioned proximate to the ambient light sensor to receive ambient light and to focus ambient light onto the ambient light sensor;

a processor coupled to the ambient light sensor, the processor configured to:

receive a signal from the ambient light sensor comprising a peak corresponding to ambient light focused onto the ambient light sensor by the light focusing element, the peak comprising a high frequency, the signal correlating an incident angle of ambient light to a light intensity, the incident angle of ambient light defined with respect to the ambient light sensor;

determine a plurality of points associated with the signal such that the plurality of points are outside the peak associated with the signal;

replace the peak with a plurality of values interpolated based on the plurality of points, thereby producing a smooth signal; and based on the smooth signal, determine ambient light intensity.

8. A method to correct ambient light intensity measurement the method comprising: receiving a signal from an ambient light sensor, wherein the signal correlates an incident angle to a light intensity, the incident angle defined with respect to the ambient light sensor, wherein the signal comprises a peak corresponding to incoming light focused by a light focusing element, and wherein the peak comprises a high frequency; determining a plurality of points associated with the signal such that the plurality of points are outside the peak associated with the signal; replacing the peak with values interpolated based on the plurality of points; and based on the smooth signal, determining ambient light intensity.

* * * * *